United States Patent
Singhal et al.

(10) Patent No.: US 6,939,908 B1
(45) Date of Patent: Sep. 6, 2005

(54) OPTICALLY CLEAR ABRASION RESISTANT POLYMER-CERAMIC COMPOSITE COATINGS

(75) Inventors: Amit Singhal, Piscataway, NJ (US); Ganesh Skandan, Piscataway, NJ (US)

(73) Assignee: Nanopowder Enterprises Inc, Piscataway, NJ (US)

(*) Notice: Subject to any disclaimer, the term of this patent is extended or adjusted under 35 U.S.C. 154(b) by 0 days.

(21) Appl. No.: 10/244,345

(22) Filed: Sep. 16, 2002

Related U.S. Application Data

(60) Provisional application No. 60/322,585, filed on Sep. 17, 2001.

(51) Int. Cl.$^7$ .............................................. C08K 3/20
(52) U.S. Cl. ................... 524/430; 524/424; 524/428; 524/433; 524/437; 524/497; 524/588; 106/287.12; 106/287.13; 106/287.16; 106/287.19
(58) Field of Search ................... 524/424, 428, 524/430, 433, 437, 497, 492, 493, 588; 106/287.12, 287.13, 287.16, 287.19, 287.1, 287.15, 287.17, 286.1; 528/102

(56) References Cited

U.S. PATENT DOCUMENTS

| | | | | |
|---|---|---|---|---|
| 5,789,082 A | * | 8/1998 | Treadway | 428/412 |
| 5,789,476 A | * | 8/1998 | Iryo et al. | 524/430 |
| 6,358,612 B1 | * | 3/2002 | Bier et al. | 428/429 |
| 6,538,092 B1 | * | 3/2003 | Terry et al. | 528/26 |

* cited by examiner

*Primary Examiner*—Margaret G. Moore
*Assistant Examiner*—Marc S. Zimmer
(74) *Attorney, Agent, or Firm*—William L. Botjer

(57) ABSTRACT

A transparent and abrasion resistant coating which includes a transparent matrix, relatively large-sized abrasion resistant ceramic particles and nanosized ceramic particles for raising the index of refraction of the matrix to that of the abrasion resistant ceramic particles. The present coating provides a scratch resistant coatings for use on plastic substrates, which are needed in a variety of applications such as, high index ophthalmic and sportswear lenses, as well as automobile side windows and aircraft cockpit applications.

20 Claims, No Drawings

OPTICALLY CLEAR ABRASION RESISTANT POLYMER-CERAMIC COMPOSITE COATINGS

REFERENCE TO RELATED APPLICATIONS

This application claims the priority of U.S. Provisional patent application Ser. No. 60/322,585 filed Sep. 17, 2001.

BACKGROUND AND SUMMARY OF THE INVENTION

This invention relates to transparent coatings. More specifically this application relates to optically clear abrasion (or scratch) and chemical-resistant films or coatings for use on polymer surfaces. These coatings can also be used on metallic substrates for improving their hardness and corrosion (or barrier) properties.

The present invention fulfills the need for scratch resistant coatings on plastic substrates, which are needed in a variety of applications such as, high index ophthalmic and sportswear lenses, automobile side windows and transparencies for aircraft cockpits. Plastic substrates such as, polycarbonate and acrylic, can scratch easily and lose transparency quickly during daily use and maintenance. Hard and optically transparent coatings for plastic substrates possess significant market potential. However, a satisfactory coating technology is not yet available.

The object of this invention is to develop a easily applied coating technology, which can satisfy the need of ophthalmic, automobile and aircraft industries. The existing coatings on plastic substrates have limitations such as low refractive index and short operational life. Incorporation of a high volume fraction of large ceramic particles in a polymer nanocomposite matrix can result in ceramic-like coatings, which will have higher hardness and better durability than those of polymer nanocomposite coatings. However, large ceramic particles embedded in a polymer matrix will scatter light because of the difference in their refractive indices and the inhomogeneous interface between the particle and the matrix. In this invention, smooth, dense and transparent films (with no haze) were fabricated by chemically modifying the surface of ceramic particles and by engineering the refractive index of polymer nanocomposite matrices.

The overall object of this invention is to provide high abrasion and chemically resistant solution-based coatings for polymeric substrates, enabling them to become attractive alternatives to inorganic glasses in applications such as, automobile side windows and head lamps, high index ophthalmic and sportswear lenses, and transparencies for aircraft cockpits and cabins. This is because even though glass is hard and optically transparent, it has disadvantages in weight and safety. Many optically transparent polymers, such as polycarbonate, polyetherimide and acrylic, have lower densities and a much higher toughness than glass. It has been estimated that the use of polycarbonate substrates over glass in automobile window applications will reduce the total weight by 40%. Additionally, polycarbonate materials have high impact resistance and provide a high degree of design freedom. The single biggest roadblock to the widespread use of polycarbonates is the lack of an adequately hard and optically transparent coating that can provide scratch as well as wear resistance. Without protection, the material can suffer from severe surface damage and lose transparency quickly during daily use and maintenance.

Several organic (e.g., urethane) and silicone-based abrasion resistant coatings have been developed for plastics used in ophthalmic and non-ophthalmic lens applications. However, these coatings do not meet the stringent requirements for both automobile side windows and aircraft transparency applications. Additionally, the eye lens industry is focusing on producing high index lenses (refractive index, $n_D \sim 1.6$–$1.7$), which require high refractive index ($n_D = 1.63$–$1.68$) wear resistant coatings. The refractive index of presently available organic abrasion resistant coatings is $\sim 1.5$, making them unsuitable for high index lenses. Therefore, there is an immediate need for coatings that have high refractive index as well as excellent abrasion resistance.

Recently, optical coatings on polymeric substrates have been developed using two approaches: wet chemical methods (e.g., sol-gel process), and vacuum/gas phase processes. The latter approach is based on the deposition of an inorganic material by a plasma torch. Solution processes have been used to develop polymer-nanophase oxide composite materials by either dispersing surface modified nanoparticulates (diameter ~10–20 nm) in siloxane polymers, or sol-gel based organic/inorganic hybrid networks called 'Ceramers'.

Coatings on polymers by incorporating oxide or hydroxide nanoparticles in epoxysilane have been developed (See e.g.: M. Mennig, P. W. Oliveira, A. Frantzen and H. Schmidt, *Thin Solid Films*, 351, 225 (1999)). Methacrylate functionalized silanes and nanoscaled boehmite particles were used for the preparation of UV curable hard coatings by the sol-gel technique. An inorganic network was formed as a result of controlled hydrolysis and condensation of the methacryloxysilanes in the presence of nanoparticles (particle size ~15 nm). Transparent coatings were prepared on plastic substrates (e.g., polycarbonate, PMMA). The coatings showed excellent adhesion and good abrasion resistance. Loss in transmission was 10% after 1000 cycles in a Taber abraser test (CS 10F rolls, 5.4 N). Others have synthesized polymer nanocomposite coatings by mixing electrostatically stabilized oxide particulate sots with 3-glycidoxypropyltrimethoxysilane (GPTS). An amino functionalized alkoxysilane was used as condensation catalyst and the nanocomposite material was thermally cured at 130° C. after spin coating on pretreated polycarbonate substrates. After 1000 cycles Taber abrasion test (CS-10F, 500 g), loss in transmittance due to scattering was 2–6%. However, the index of refraction of these coatings was too low for many optical applications.

Others have synthesized a variety of sol-gel coatings (see e.g., U.S. Pat. No. 5,316,855). The best abrasion resistance was obtained for sol-gel coatings synthesized using diethylenetriamine (DETA) that was functionalized at its amine groups with 3-isocyanatopropyltriethoxysilane. The functionalized DETA (F-DETA) was mixed with tetramethylorthosilicate (TMOS). These reactants undergo a comparable sol-gel reaction similar to typical metal alkoxide chemistry, thereby producing an insoluble network material containing a good dispersion of the functionalized organic, along with the hydrolyzed and condensed silicon alkoxide group. The final coating on a polycarbonate substrate was transparent and few microns in thickness. The transmission of these coatings was 98.5 after a 500-cycle Taber test using CS 10 wheels, 500 g load per wheel. However, the refractive index of such coatings was ~1.5, and the shelf life of the coating formulations was only a few days. It should be noted that such a short life of the formulation is unacceptable for commercial applications. Additionally, automobile manufacturers require the life of coatings to be at least 8 years. It is generally accepted that pure sol-gel coatings may not be able to sustain the tough standards required for practical applications.

To utilize the full potential of polymer nanocomposite coatings for optical applications, including high index ophthalmic lenses, relatively large-sized (at least 0.1–0.4 microns) ceramic wear resistant particles (such as alumina) need to be incorporated in a polymer nanocomposite matrix. The wear properties of polymer nanocomposite coatings will be dramatically enhanced because of the larger wear surface ($4\pi r^2$) of large particles in comparison to that of nanoparticles. Large particles offer more resistance to deformation, while nanoparticles simply get displaced and provide little resistance to shear forces. Additionally, incorporating ceramic particles will also enhance the coating life; simultaneously, coatings consisting of high volume fraction of alumina particles will have a higher refractive index than that of siloxane-based coatings, if particles are dispersed homogeneously.

However, a majority of ceramic particles cannot be used in existing siloxane or polymer-based coatings because they will scatter light. Ceramic particles will scatter according to the following equation:

$$\text{Scatter intensity of light} = I \propto (\Delta n_D)^2 V^2$$

where, V is the volume of the scattering particle, and $\Delta n_D$ is the difference in the refractive index of the particle and the medium of suspension.

Scattering leads to severe loss of optical transparency; as a result, a siloxane coating which has an $n_D$ of 1.5 containing just a few large-sized ceramic particles dispersed in it, will be opaque. On the other hand, the scattered light intensity of large-sized particles will be insignificant if $\Delta n_D$ is negligible, which will be the case for a matrix that has the same value as of ceramic particles ($n_D$ of $Al_2O_3$ is ~1.7). This is also the refractive index of coatings needed for high-index ophthalmic lenses.

In the development of the present invention we have focused our efforts on obtaining optically transparent nanocomposite films containing alumina particles by engineering the surface of particles, and by manipulating the refractive index of the nanocomposite matrix. The present development includes:

a) Formation of coatings with a refractive index in the range of 1.66–1.68.
b) Formation of optically transparent coatings consisting of alumina particles in a nanocomposite matrix and
c) Demonstration of improved mechanical properties in coatings by the addition of particles compared to coatings fabricated without incorporating alumina particles.

The present invention thus provides the synthesis of optically clear nanocomposite films consisting of large-sized alumina particles/aggregates (average size>0.1 μm).

DESCRIPTION OF THE PREFERRED EMBODIMENTS

The transparent abrasion resistant coating of the present invention is comprised of three parts:

1) A transparent organic-inorganic compound such as, but not limited to, 3-glycidoxypropyltrimethoxysilane (GPTS), n-methylaminopropyltrimethoxysilane, methacryloxypropyltrimethoxy silane, titanium methacrylate triisopropoxide, 5–6 epoxyhexyltriethoxysilane, 2(3,4-epoxycyclohexyl) ethyltriethoxysilane and diethylenetriamine (DETA) functionalized at its amine groups with 3-isocyanatopropyltriethoxysilane. These compounds contain alkoxy groups, which can be hydrolyzed and condensed to form an inorganic network. And an organic group, which can be cross-linked to form an organic network.

2) A relatively large sized abrasion resistant particle such as alumina. Also suitable as such particles are metal oxides (e.g., $Al_2O_3$, $ZrO_2$, $SiO_2$, $SnO_2$, $BaTiO_3$, $In_2O_3$:Sn, $Y_2O_3$, MgO), carbides (e.g., SiC), nitrides (e.g., AlN, AlON, $Si_3N_4$ and BN) and diamond. Such large sized abrasion resistant particle have an average particle size (or aggregate size) of 50 to 2000 nanometers, preferably 100 nm to 400 nm, and can be incorporated in an amount of 5 to 50 weight % of the finished film or coating.

3) A nanoparticle sized ceramic for raising the index of refraction of the transparent organosilane compound, while retaining transparency of the compound, so that it matches that of the abrasion resistant particles, a suitable material is $TiO_2$, which has an $n_D$ in the range of 2–2.4 depending on its crystal structure, other suitable materials are nanoparticles of $Al_2O_3$, MgO, $MgAl_2O_4$, BeO, AlON, AlN, GaN, SiC, $ZrO_2$, $Si_3N_4$, $Y_2O_3$, $SnO_2$, and diamond. The nanoparticle average size is in the range 1 to 100 nanometers, which will not effect the transparency of the compound, and in an amount sufficient to raise the index of refraction of the organosilane nanoparticle matrix to that of the abrasion resistant particles, which can be from 1 to 90wt % of the finished film or coating.

Exemplary Formulations

Exemplary transparent abrasion resistant coatings of the present invention were produced in the following manner using $TiO_2$ nanoparticles and alumina ($Al_2O_3$) abrasion resistant particles. As noted above other nanoparticles and other abrasion resistant may also be used.

Nanoparticles and Abrasion Resistant Particles

Nanoparticle sized particles of $TiO_2$ can be either commercially purchased or produced by a Combustion Flame—Chemical Vapor Condensation (CF-CVC) process from a metalorganic precursor, titanium iso-propoxide ($Ti(OC_3H_7)_3$) as described in U.S. Pat. Nos. 5,514,350 and 5,876,683; or produced by a sol gel process. The nanosized particles of $TiO_2$ produced by the sol gel process have been found to be particularly suitable as they can be homogenously dispersed in organic-inorganic polymer solution without any surface modification as is described in detail below.

A 20 wt % suspension of $Al_2O_3$ particle in water is commercially available. $Al_2O_3$ can also be also produced by the CF-CVC process. The $Al_2O_3$ powder (average primary particle size ~16 nm) had an average aggregate size of 160 nm, which was measured by using laser light scattering on a suspension of this powder in pH adjusted water. It is to be noted that the particle size of $Al_2O_3$ powders, suspended in a solvent or in a polymer nanocomposite matrix, will be equivalent to the aggregate size of these powders. $Al_2O_3$ powder has γ- and α-alumina phases, the $n_D$ of γ- and α-alumina phases is 1.68 and 1.76, respectively. The refractive index of γ-alumina phase is more suitable for high-index ophthalmic lenses; additionally, the particle size has more influence on the wear properties than the crystalline phase of the particles.

Surface Modification

In general, high surface area ceramic particles tend to agglomerate making them difficult to be dispersed in solvent and matrices. One of the objectives of modifying the surface of ceramic particles is to avoid agglomeration which occurs because of the inter-particulate attraction. In this work, the surface of particles was modified by using alkoxysilane in order to obtain a homogenous distribution of ceramic particles in an organosilane matrix. Alkoxy groups on a silicon atom can be hydrolyzed by the hydroxyl groups on ceramic particles and therefore, coat the surface of particles. The coated particles do not agglomerate and form a stable dispersion.

In the present invention, $Al_2O_3$ and $TiO_2$ particles were stabilized by an acidic GPTS solution (pH: 1–5). GPTS solution can be acidified by adding a small amount of acetic acid (5–10 wt % of GPTS). $H^+$ acts as a catalyst and promotes the hydrolysis reaction of the silane with hydroxyl groups on particles as shown below:

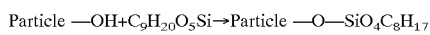

Particle —OH+$C_9H_{20}O_5Si$→Particle —O—$SiO_4C_8H_{17}$

A similar methodology was used to disperse alumina particles in F-DETA solution (details of this solution are described below). Particles of both types of ceramics remain suspended in solution for an extended period of time: several days to weeks.

Prepare Coating Formulations

A variety of solution formulations were prepared, which can be classified into mainly three groups: (1) a primer solution, (2) GPTS based solutions, and (3) F-DETA based solutions.

Preparation of the Primer Solution:

It has been found that amine functional aloxysilanes can significantly improve the adhesion between the interfaces of sol-gel coatings and polycarbonates, such as bisphenol-A polycarbonate. In this work, we have utilized 5–10 wt % 3-aminopropyltriethoxysilane (APTS) solution in isopropanol (see J. Wen, K. Jordens, and G. L. Wilkes, Mat. Res. Soc. Symp Proc., 435, 207 (1997)). This solution was prepared by mixing 2 cc of APTS in 27 ml of dry isopropanol. It was found that properties of the final solution are dependent on the moisture content in each of the constituents Preparation of GPTS-based Solutions As received GPTS (from Aldrich) was used. In several cases, as-synthesized solution was diluted before coating to reduce the viscosity. The weight fraction of $TiO_2$ in coatings ranged between 24 to 74 wt %, and the weight fraction of alumina particles was either 18 (GPTS03) or 50 wt % (GPTS02). Different base solutions produced by using GPTS are listed in Table I.

In case of solutions GPTS01 and GPTS02, grafted ceramic particles were mixed with the final solution. In both of these solutions, particles tend to settle at the bottom; however, on ultrasonicating these solutions, a homogeneous solution was prepared. In case of GPTS03, the alumina suspension was first mixed with GPTS solution for one hour in order to stabilize the particles. This solution was mixed with a pre-hydrolyzed solution of titanium iso-propoxide. The mixed solution was diluted with 2-methoxyethanol, and residual water and isopropanol were evaporated in vacuum to improve the flow properties of the solution during spin-coating. The GPTS03 solution remained stable for at least a month at room temperature.

Preparation of F-DETA based Solutions:

Functionalized DETA (F-DETA) was prepared by adding three moles of 3-isocyanatopropyltriethoxysilane (3-ICPTES) dropwise into a solution of one mole of DETA in 2-methoxyethanol. A 5–7% excess amount of 3-ICPTES is often used to ensure complete reaction of the amine groups. Any unreacted 3-ICPTES will react with the solvent so that no free isocyanato (-CNO) groups exist in the F-DETA product. The reaction is strongly exothermic, so this process is carried out in an ice bath to avoid possible reactions. 2.5g of DETA was dissolved in 10 g of 2-methoxyethanol in which 20 g of 3-ICPTES was added dropwise. During the addition of 3-ICPTES, the flask was kept in an ice bath. The final solution is referred to F-DETA (70 wt % in alcohol) (see K. Jordens and G. Wilkes, J. Macromol. Sci.—Pure Appl. Chem, A38(2), 185–207 (2001))

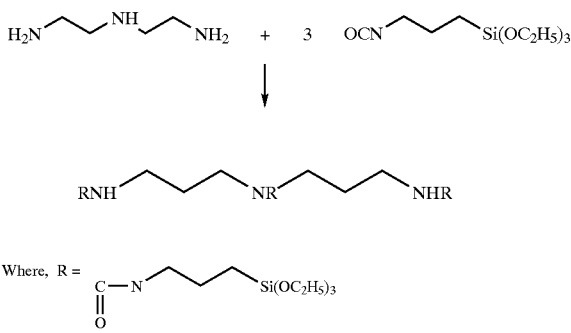

F-DETA solution was used as the base solution to prepare a variety of coating solutions, which are described in Table II.

TABLE I

List of base solutions produced by using GPTS

| Sol Name | GPTS (g) | Ti(OC$_3$H$_7$)$_4$ (g) | Conc. HCl (g) | Alcohol (g) | 20 wt % alumina suspension (g) | APTS grafted alumina (g) | APTS grafted titania (g) |
|---|---|---|---|---|---|---|---|
| GPTS00 | 2.14 | 6.65 | 3 | 19 | — | — | — |
| GPTS01 | 2.14 | 6.65 | 3 | 19 | — | — | 3.6 |
| GPTS02 | 2.14 | 6.65 | 3 | 19 | — | 3.6 | — |
| GPTS03 | 2.14 | 6.65 | 3 | 3.2 | 4.9 | — | — |
| GPTS04 | 2.14 | 9.5 | 4 | 19 | — | — | — |
| GPTS05 | 2.14 | 6.65 | 3 | 5 | 8.5 | — | — |

TABLE II

Description of coating formulations with F-DETA

| Solution Name | F-DETA (g) | Acetic acid (g) | Water (g) | Alumina particles (g) | Ti(OC$_3$H$_7$)$_4$ (g) | Alcohol (g) |
|---|---|---|---|---|---|---|
| FDETA00 | 2 | 0.35 | 0.5 | | 0 | 2 |
| FDETA01 | 2 | 0.35 | 0.5 | 0.3 | 0 | 2 |
| FDETA02 | 2 | 0.35 | 0.5 | 0.3 | 2 g mixed with 0.27 g of CH$_3$COOH | 2 |
| FDETA03 | 2 | 0.35 | 0.5 | 0.9 | 0 | 2 |
| FDETA04 | 2 | 0.35 | 0.5 | 0.3 | 3 g mixed with 1.32 g of CH$_3$COOH | 5 |
| FDETA05 | 1 | .025 | | 0.15 | 3 g hydrolyzed with 0.35 g of conc. HCl | 4 |

Preferred Formulation

In a preferred coating formulation 2 ml (2.14 g) of 3-glycidoxypropyltrimethoxysilane (GPTS) was mixed with a commercially available 20 wt % acidic alumina suspension. This solution was stirred for about an hour for hydrolyzing the Si-OR group on the GPTS molecule. The hydrolyzed Si-OH species condense with the hydroxyl groups on the surface of ceramic particles. In another flask, 3 ml of concentrated HCl (~12 M) solution was mixed with 4 ml of 2-methoxyethanol. While this solution was stirred vigorously, 7 ml (6.65 g) of titanium isopropoxide was added drop-wise into the solution for producing a titania nanoparticle sol. The GPTS/alumina solution was added drop-wise into the titania sol, while the titania sot was stirred with a magnetic stirrer. After mixing the solution for about 0.5 hr, the solution was vacuum dried to remove the excess water and alcohol. The total weight loss for the solution was kept between 5.5 and 6.0 g; after the weight loss, the solution became very viscous. 14 ml of 2-methoxyethanol was added to this viscous paste for reducing the reaction kinetics and increasing the stability of the solution. This solution was further diluted by a factor of 3 with 2-methoxyethanol solvent to form the final coating formulation.

Performance

The coatings developed in accordance with this invention have significant performance advantages as compared to previous coatings. The present coatings, using nanoparticles such as TiO$_2$, have indices of refraction in excess of 1.5 and more particularly in the range of 1.6–1.7 which is sufficient to match the index of that of ceramic abrasion resistant particles, such as alumina, and sufficient for use in ophthalmic and sportswear lenses. The hardness and modulus (stiffness) of the coatings depends on the weight percentage of the abrasion resistant particles and can far exceed that of the plastic substrates such as polycarbonates. The hardness of polycarbonate is ~180 MPa and it has a modulus of ~3.6 GPa, while the hardness of the present coatings range from 280 to 450 MPa, with the modulus ranging from 3.8 to 5.5 GPa depending on formulation.

Abrasion properties of the present coatings were evaluated by using a "Taber" test (CS10 wheels, 500 g and 500 cycles). It was observed that the abrasion properties of the coatings is a direct function of the amount of ceramic materials. The percentage transparency (at a wavelength of 450 nm) after the Taber test of a blank polycarbonate substrate and three substrates coated with F-DETA based solutions containing different weight fraction of alumina was measured. As the loading of alumina particles in coating increases, the percentage transparency of abraded substrates improves suggesting an enhancement in the abrasion resistance of coatings. At a high weight fraction (~43%) of alumina particles, a ceramic-like coating was produced, since the transmission of the coating increased as alumina wheels on the Taber instrument merely polished the hard and the rough surface of the coating. Indeed, the "polished" coating had a transparency which exceeded that of the coating before being subjected to the abrasion test. This implies that at high weight fractions of alumina particles, highly scratch resistant coatings were produced. Since these are ceramic-like coatings, they will posses good operational life.

While the above description has emphasized optical applications it is to be noted that the benefits of the present invention are equally applicable to any where an abrasion resistant coating for plastic is desired. These coatings can also be used on metallic substrates for improving their hardness and corrosion (or barrier) properties. The present invention has been described with respect to exemplary embodiments. However, as those skilled in the art will recognize, modifications and variations in the specific details which have been described and illustrated may be resorted to without departing from the spirit and scope of the invention as defined in the appended claims.

What is claimed is:

1. A transparent and abrasion resistant coating comprising:
   a) a transparent organic-inorganic compound, the organic-inorganic compound being selected from a group consisting of: 3-glycidoxypropyltrimethoxysilane (GPTS), n-methylaminopropyltrimethoxysilane, methacryloxypropyltrimethoxy silane, titanium methacrylate triisopropoxide, 5-6 epoxyhexyltriethoxysilane, 2-(3,4-epoxycyclohexyl)ethyltriethoxysilane and diethylenetriamine (DETA)functionalized at its amine groups with 3-isocyanatopropyltriethoxysilane;
   b) large-sized abrasion resistant particles/aggregates of γ-phase Al$_2$O$_3$, having an average size of 100 nm to 400 nm and
   c) nanosized ceramic particles for raising the index of refraction of the polymer to that of the abrasion resistant ceramic particles, the nanosized ceramic particles having an average size of less than 100 nm.

2. The coating of claim 1, wherein the nanosized ceramic particles are TiO$_2$.

3. The coating of claim 1, wherein the nanosized ceramic particles have a refractive index higher than 1.5 for radiation with a wavelength in the range of 0.3–1 μm.

4. The coating of claim 1, wherein the nanosized ceramic particles are selected from a group consisting of: Al$_2$O$_3$, MgO, MgAl$_2$O$_4$, TiO$_2$, BeO, AlON, AlN, GaN, SiC, ZrO$_2$, Si$_3$N$_4$, Y$_2$O$_3$, SnO$_2$, and diamond.

5. The coating of claim 1, wherein the relative amount of nanosized particles to the combined amount of nanosized particles, organic-inorganic compound and large-sized particles is from about 1% to 90%, by weight.

6. The coating of claim 1, wherein the relative amount of large-sized particles to the combined amount of organic-inorganic compound nanosized particles and large-sized particles is from about 1 to 75% by weight.

7. The coating of claim 1, wherein the relative amount of large-sized particles to the combined amount of organic-inorganic compound nanosized particles and large-sized particles is from about 5 to 50% by weight.

8. An abrasion resistant coating comprising:
a) a matrix comprising a transparent organosilane compound,
b) nanosized $TiO_2$ particles having an average size of less than 100 nm for raising the index of refraction of the matrix to above 1.5, and
c) large-sized abrasion resistant ceramic particles having an average size of greater than 100 nm and having an index of refraction greater than 1.5.

9. The coating of claim 8, wherein the abrasion resistant large-sized ceramic particles are γ-phase $Al_2O_3$.

10. The coating of claim 8, wherein the organosilane compound, is selected from a group consisting of: 3-glycidoxypropyltrimethoxysilane (GPTS), n-methylaminopropyltrimethoxysilane, methacryloxypropyltrimethoxy silane, 5-6 epoxyhexyltriethoxysilane, 2-(3,4-epoxycyclohexyl)ethyltriethoxysilane and diethylenetriamine (DETA) functionalized at its amine groups with 3-isocyanatopropyltriethoxysilane.

11. The coating of claim 8, wherein the large-sized ceramic particles are selected from a group consisting of: $Al_2O_3$, $ZrO_2$, $SiO_2$, $SnO_2$, $BaTiO_3$, $In_2O_3$:Sn, $Y_2O_3$, MgO, SiC, AlN, AlON, $Si_3N_4$, BN and diamond.

12. The coating of claim 8, wherein the large-sized abrasion resistant ceramic particles have an average size of less than 400 nm.

13. A transparent and abrasion resistant coating comprising:
a) a transparent organic-inorganic compound, selected from a group consisting of: 3-glycidoxypropyltrimethoxysilane (GPTS), n-methylaminopropyltrimethoxysilane, methacryloxypropyltrimethoxy silane, titanium methacrylate triisopropoxide, 5-6 epoxyhexyltriethoxysilane, 2-(3,4-epoxycyclohexyl)ethyltriethoxysilane and diethylenetriamine (DETA) functionalized at its amine groups with 3-isocyanatopropyltriethoxysilane.
b) abrasion resistant ceramic particles/aggregates of γ-phase $Al_2O_3$ in the size range of 100 nm to 400 nm; and
c) nanosized ceramic particles in the size range of less than 100 nm for raising the index of refraction of the polymer to that of the abrasion resistant ceramic particles, said nanosized ceramic particles being selected from a group consisting of: $Al_2O_3$, MgO, $MgAl_2O_4$, $TiO_2$, BeO, AlON, AlN, GaN, SiC, $ZrO_2$, $Si_3N_4$, $Y_2O_3$, $SnO_2$, and diamond.

14. The coating of claim 13, wherein the nanosized ceramic particles have a refractive index higher than 1.5 for radiation with a wavelength in the range of 0.3–1 μm.

15. The coating of claim 13, wherein the nanosized ceramic particles are different in material from the abrasion resistant ceramic particles.

16. An abrasion resistant coating comprising:
a) a matrix comprising a transparent organosilane compound,
b) nanosized ceramic particles having an average size of less than 100 nm for raising the Index of refraction of the matrix to above 1.5, and
c) large-sized abrasion resistant γ-phase $Al_2O_3$ particles having an average size of greater than 100 nm and having an index of refraction greater than 1.5.

17. The coating of claim 16, wherein the nanosized ceramic particles are selected from a group consisting of: $Al_2O_3$, MgO, $MgAl_2O_4$, $TiO_2$, BeO, AlON, AlN, GaN, SiC, $ZrO_2$, $Si_3N_4$, $Y_2O_3$, $SnO_2$, and diamond.

18. The coating of claim 16, wherein the organosilane compound, is selected from a group consisting of: 3-glycidoxypropyltrimethoxysilane (GPTS), n-methylaminopropyltrimethoxysilane, methacryloxypropyltrimethoxy silane, , 5-6 epoxyhexyltriethoxysilane, 2-(3,4-epoxycyclohexyl)ethyltriethoxysilane and diethylenetriamine (DETA) functionalized at its amine groups with 3-isocyanatopropyltriethoxysilane.

19. The coating of claim 16, wherein the nanosized ceramic particles are selected from a group consisting of: $Al_2O_3$, MgO, $MgAl_2O_4$, $TiO_2$, BeO, AlON, AlN, GaN, SiC, $ZrO_2$, $Si_3N_4$, $Y_2O_3$, $SnO_2$, and diamond.

20. The coating of claim 16, wherein the large-sized abrasion resistant ceramic particles have an average size of less than 400 nm.

* * * * *